United States Patent [19]

Poe

[11] 4,130,260
[45] Dec. 19, 1978

[54] ADJUSTABLE KEEPER FOR PIN LATCHES
[75] Inventor: L. Richard Poe, Long Beach, Calif.
[73] Assignee: Hartwell Corporation, Placentia, Calif.
[21] Appl. No.: 828,030
[22] Filed: Aug. 26, 1977
[51] Int. Cl.² .................................................. B64C 1/14
[52] U.S. Cl. ........................... 244/129.5; 292/341.18; 292/139
[58] Field of Search ............... 244/129.5, 129.1, 129.4; 292/341.18, 139

[56] References Cited
U.S. PATENT DOCUMENTS

| 839,556 | 12/1906 | Cuff | 292/341.18 |
|---|---|---|---|
| 1,390,519 | 9/1921 | Evans | 292/341.18 |
| 2,089,163 | 8/1937 | Hansen | 292/341.18 |
| 2,312,155 | 2/1943 | Flaxman | 244/129.5 |
| 2,486,772 | 11/1949 | Wuerl | 292/341.18 |
| 2,783,007 | 2/1957 | Nocifi et al. | 244/129.4 |
| 2,797,884 | 7/1957 | Peed, Jr. | 244/129.5 |
| 3,025,091 | 3/1962 | Peras | 292/139 |

Primary Examiner—Galen L. Barefoot
Attorney, Agent, or Firm—Lyon & Lyon

[57] ABSTRACT

An adjustable keeper for pin latches, particularly suited for doors or panels mounted in flush relation to the external surface of an aircraft and thus subject to extreme air loads incidental to flying; one or more of the adjustable keepers being positioned for engagement by a corresponding pin latch, and including a screw assembly for adjusting the position of the keeper, the screw assembly having a tool engagable head exposed through a small perforation in the door or panel or adjacent thereto and thus accessible, when the door or panel is closed, to adjust the keeper so as to apply a preselected force to the pin latch which is transmitted to the door or panel to retain the door or panel in its flush condition.

2 Claims, 6 Drawing Figures

ADJUSTABLE KEEPER FOR PIN LATCHES

BACKGROUND

Aircraft are provided with a plurality of surface mounted hinged doors and removable panels secured in place by latches having externally accessible flush components, the latches engaging keepers disposed in the frame surrounding the door or panel. Typically such latches are only accessible for adjustment when the door or panel is open. If several latches are required, which is usually the case, adjustment of the latches, so that the latch retaining force exerted by the keepers is uniformly distributed and adequate for the severe forces which are applied, poses a problem and requires frequent attention.

SUMMARY

The present invention is directed to an adjustable keeper for pin latches which overcomes the problem previously indicated and is summarized in the following objects:

First, to provide an adjustable keeper for pin latches which is particularly adapted for use on aircraft in conjunction with flush mounted latches, to secure flush mounted doors or panels, the keeper being mounted in the frame structure for such doors or panels and having an adjustor assembly accessible from the exterior of the aircraft.

Second, to provide a keeper, as indicated in the previous object, wherein a plurality of keepers may be used and are accessible through small openings, when the door or panel is closed and the latches are engaged by their respective keepers so that each keeper may be adjusted without disturbing the adjustment of the other keepers.

DETAILED DESCRIPTION

Figure 1:
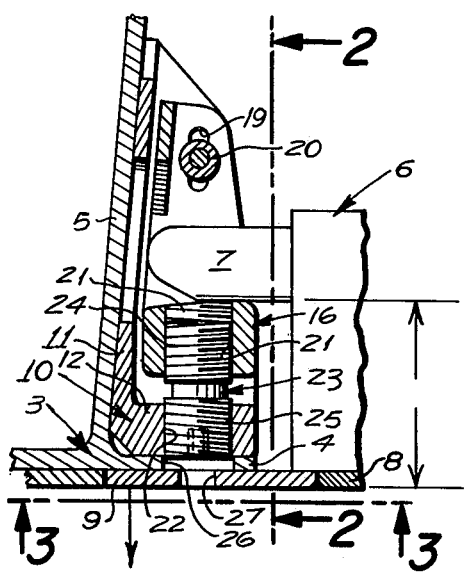
FIG. 1 is an enlarged sectional view taken through 1—1 of FIG. 6 showing the adjustable keeper and adjacent portions of the pin latch in its secured position.

The present invention is intended for use in conjunction with a panel 1 which is positioned flush with the surrounding surface 2 of an aircraft. The panel may be a removable member or may be hinged to form a door. The term "panel" as herein used is intended to include a hinged door. The periphery of the opening in the aircraft surface which receives the panel 1 is bordered by a supporting frame 3 including a border flange 4 which projects inwardly from the margins of the panel receiving opening and a reinforcing flange 5 extending essentially perpendicular to the aircraft surface 2 at the periphery of the panel 1.

The panel 1 is provided with one or more latch units 6 depending upon the size of the panel, each latch unit including a reciprocable latch pin 7 and a handle structure 8 for manipulating the latch pin, the handle structure having a position flush with the surface of the panel 1.

The panel 1 includes a margin 9 which overlies the border flange 4. When the panel is closed, the latch unit 6 is disposed perpendicular to the adjacent edge of the panel and the latch pin 7 when extended is parallel to and spaced from the adjacent margin 9.

The structure thus far described may be considered as conventional. The latch unit may be similar to the latch mechanism shown in U.S. Pat. No. 2,721,750 or in copending application Ser. No. 735,967, filed Oct. 27, 1976, now U.S. Pat. No. 4099751.

The adjustable keeper, which constitutes the present invention, includes a keeper mounting bracket 10 which is secured to the supporting frame 3. The mounting bracket includes a mounting plate 11 secured to the reinforcing flange 5 of the supporting frame 3 and an end flange 12 underlying the border flange 4. The mounting plate 11 of the keeper mounting bracket 10 is provided with parallel flanges 13 and also protrudes laterally therefrom forming side extensions 14 which receive bolts or other fasteners 15 for attachment to the reinforcing flange 5. The latch pin 7, when extended, is centered between the flanges 13.

Slidably mounted between the flanges 13 is a channel shaped keeper 16 including a keeper bar 17 disposed between side flanges 18 confronting the flanges 13. The side flanges 18 are provided with slots 19 and a retainer pin 20 extends through the slots and is secured at its ends in the flanges 13. The end flange 12 between the flanges 13 confronts the keeper bar 17 and is increased in thickness. The keeper bar 17 is also relatively thick. The keeper bar 17 is positioned for sliding engagement by the latch pin 7. The keeper bar 17 and the confronting portion of the end flange 12 are provided with screw threaded bores 21 and 22 of opposite pitch which receive an adjustment screw 23 having screw threaded portions 24 and 25 also of opposite pitch. The border flange 4 is provided with a clearance perforation 26 in alignment with the adjustment screw and the margin 9 of the panel is provided with an acess perforation 27. The exposed end of the adjustment screw 23 is provided with a polygonal socket 28 for receiving an Allen wrench, not shown.

The adjustable keeper is utilized as follows:

The keeper bar 17 is adjusted by the screw 23 to approximately or slightly less than the distance between the panel 1 and the confronting side of the latch pin 7. After the panel 1 has been positioned and the latch pin 7 extended, the screw 23 is turned to cause the keeper bar 17 to exert a predetermined load on the latch pin 7. For this purpose, it is preferred to use a torque measuring tool. The amount of force exerted by the keeper bar 17 is such that the latch pin may be retracted. When the panel is replaced, the interference between the pin latch and the keeper bar does not interfere with extension of the pin latch. If several latch units are used, each keeper bar 17 may be adjusted to apply a preselected force without disturbing the force as applied to the other keeper bars. It will be noted that the force applied by the keeper bar 17 against the latch pin 7 is transmitted by the latch unit 6 to the panel and applied by the panel margin 9 to the confronting border flange 4.

Figure 2:
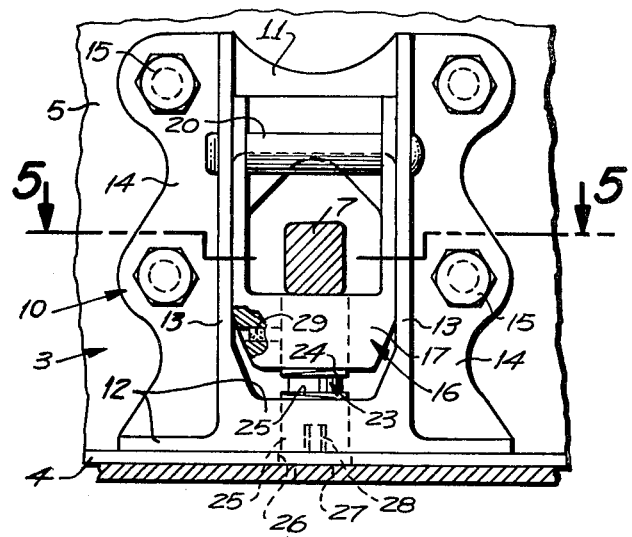
FIG. 2 is a fragmentary sectional view taken through 2—2 of FIG. 1.
Figure 3:
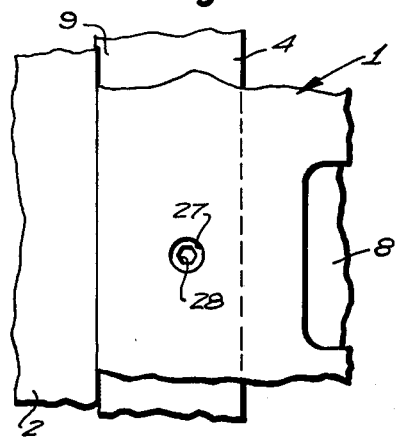
FIG. 3 is a fragmentary elevational view taken from 3—3 of FIG. 1 showing a panel and adjacent portion of the surface of an aircraft.
Figure 5:
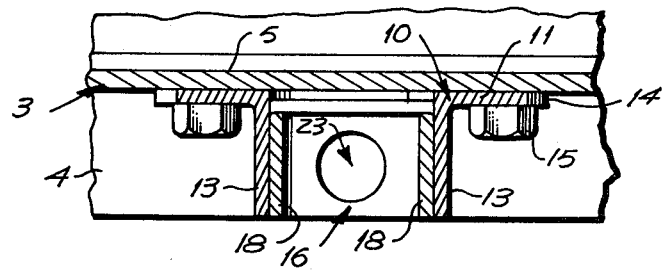
FIG. 5 is a transverse sectional view taken through 5—5 of FIG. 2 with the pin latch omitted.
Figure 4:
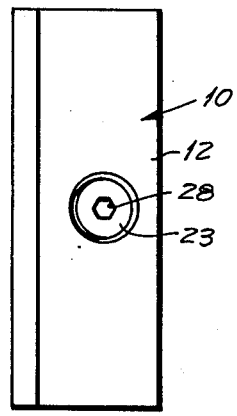
FIG. 4 is an outer end view of the keeper assembly.
Figure 6:
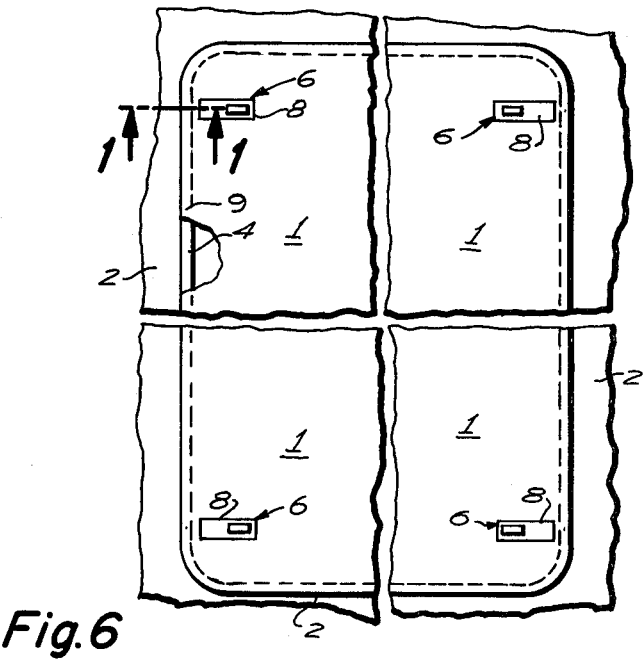
FIG. 6 is a fragmentary elevational view at reduced scale showing the panel and adjacent portion of the aircraft when the panel is in its closed position.

In order to prevent shifting of the adjustment screw 23, a friction plug 29 may be used as indicated in FIG. 2.

Having fully described my invention, it is to be understood that I am not to be limited to the details herein set forth, but that my invention is of the full scope of the appended claims.

I claim:

1. An adjustable keeper for a pin latch carried by an aircraft panel, the margins of which overlap a supporting frame to dispose the panel flush with the surrounding surface of the aircraft, the pin latch being movable between a retracted position and an extended position in essentially parallel relation with the adjacent surface of the panel and in confronting relation to the supporting frame, said keeper comprising:
   a. a channel shaped mounting bracket secured to the supporting frame in confronting relation to the pin latch, the mounting bracket including an end portion confronting the supporting frame;
   b. a channel shaped keeper bar slidably received in the mounting bracket and including an end portion interposed between the mounting bracket and the pin latch and confronting the end portion of the mounting bracket;
   c. the end portions of the mounting bracket and keeper bar having coaxial internally screwthreaded bores of opposite pitch;
   d. and a screw means having opposed screwthreaded portions received in the screwthreaded bore, the screw means having a tool socket, the supporting frame being perforated for access to a tool inserted in the socket, for applying a force against the pin latch in a direction to urge the panel into firm contact with the supporting frame.

2. A keeper as defined in claim 1 in which a plurality of pin latches are spaced about the periphery of the panel, and wherein:
   a. a corresponding number of keepers are provided, the screw means being individually adjustable while the panel is in its closed position whereby the load on the margin of the panel is uniformly distributed about the supporting frame.

* * * * *